(12) United States Patent
Kraft et al.

(10) Patent No.: US 10,940,543 B2
(45) Date of Patent: Mar. 9, 2021

(54) DRILLING TOOL AND METHOD OF OPERATING A DRILLING TOOL

(71) Applicant: PASS Stanztechnik AG, Creußen (DE)

(72) Inventors: Stefan Kraft, Schnabelwaid (DE); Andreas Deuerlein, Egloffstein (DE)

(73) Assignee: PASS Stanztechnik AG, Creussen (DE)

( * ) Notice: Subject to any disclaimer, the term of this patent is extended or adjusted under 35 U.S.C. 154(b) by 28 days.

(21) Appl. No.: 16/012,899

(22) Filed: Jun. 20, 2018

(65) Prior Publication Data

US 2018/0369933 A1 Dec. 27, 2018

(30) Foreign Application Priority Data

Jun. 22, 2017 (DE) .................... 10 2017 210 463.5

(51) Int. Cl.
| | |
|---|---|
| *B21D 28/12* | (2006.01) |
| *B23B 39/14* | (2006.01) |
| *B23G 3/00* | (2006.01) |
| *B23D 75/00* | (2006.01) |
| *B23B 41/00* | (2006.01) |
| *B23B 35/00* | (2006.01) |

(52) U.S. Cl.
CPC ............ *B23B 39/14* (2013.01); *B21D 28/125* (2013.01); *B23B 35/00* (2013.01); *B23B 41/00* (2013.01); *B23D 75/00* (2013.01); *B23G 3/005* (2013.01)

(58) Field of Classification Search
CPC ......... B23B 39/14; B23B 41/00; B23B 35/00; B23B 43/00; B23G 3/005; B23G 1/08; B21G 28/125; B23D 75/00; B21D 28/26; B21D 28/36
See application file for complete search history.

(56) References Cited

U.S. PATENT DOCUMENTS

| | | | | |
|---|---|---|---|---|
| 5,615,471 | A | * | 4/1997 | Perazzolo .............. B21D 28/12 29/33 J |
| 6,152,659 | A | | 11/2000 | Seki |
| 7,559,727 | B2 | | 7/2009 | Kouno et al. |
| 7,597,512 | B2 | | 10/2009 | Kouno et al. |
| 2005/0271485 | A1 | | 12/2005 | Kouno et al. |
| 2013/0287509 | A1 | * | 10/2013 | Guerin ................... B23Q 5/326 408/57 |
| 2015/0056035 | A1 | | 2/2015 | Sonoda et al. |

FOREIGN PATENT DOCUMENTS

| | | |
|---|---|---|
| DE | 4445363 A1 | 7/1995 |
| DE | 102014215951 A1 | 2/2016 |
| DE | 10393603 | 11/2017 |
| EP | 0666134 A1 | 8/1995 |
| EP | 2311592 B1 | 10/2013 |

OTHER PUBLICATIONS

European Patent Office, European Search Report in application EP18177144, dated Oct. 31, 2018.

* cited by examiner

*Primary Examiner* — Eric A. Gates
*Assistant Examiner* — Paul M Janeski
(74) *Attorney, Agent, or Firm* — Smartpat PLC (57) ABSTRACT

A drilling tool for a punch device, in particular for a turret punch device, comprises a housing, a tool shank arranged in the housing with a drilling means accommodated therein and a tool head arranged on the tool shaft to interact with the punch device. The tool head of the drilling tool has a ram engagement portion configured to transmit a rotational movement about a tool longitudinal axis from an external drive to the tool head.

14 Claims, 7 Drawing Sheets

DRILLING TOOL AND METHOD OF OPERATING A DRILLING TOOL

CROSS-REFERENCE TO RELATED APPLICATIONS

This application claims the priority of German Patent Application, Serial No. DE 10 2017 210 463.5, filed on Jun. 22, 2017, pursuant to 35 U.S.C. 119(a)-(d), the content of which is incorporated herein by reference in its entirety as if fully set forth herein.

FIELD OF THE INVENTION

The invention relates to a drilling tool for a punch device, in particular for a turret punch device. The invention further relates to a method of operating a drilling tool for a punch device, in particular a turret punch device.

BACKGROUND OF THE INVENTION

Drilling tools of this type are known from EP 2 311 592 B 1, for example. A method and a device for thread tapping are known from DE 103 93 603 B4, the device comprising a rotating sleeve, which is non-rotationally connected to a tap and is drivable for rotation by means of a worm wheel. DE 10 2014 215 951 discloses a multi-tool for a punch device comprising a tap drive device for driving an active tap.

SUMMARY OF THE INVENTION

An object of the present invention is to expand the possibilities of using a punch device, in particular with a base station.

This object is achieved in accordance with the invention by a drilling tool for a punch device, in particular for a turret punch device, comprising a housing, a tool shank arranged in the housing with a drilling means accommodated therein, and a tool head arranged on the tool shank to interact with the punch device, wherein the tool head has a ram engagement portion to transmit a rotational movement about a tool longitudinal axis form an external drive to the tool head, wherein it is configured in such a way that it is driven exclusively via the ram engagement portion.

It was found according to the invention that the drilling tool for the punch device can be operated flexibly on base stations and indexing stations of the machine turret of the punch device if it is configured such that the rotational movement is transmitted from the external drive to the tool head via the ram engagement portion, and the drilling tool is driven by the external drive exclusively via the ram engagement portion. The drilling tool can therefore also be operated on a base station of a machine turret of the punch device. The base station usually has no drive components configured as a tool drive. This is the difference between the base station and an indexing station, which, in order to transmit rotational movements, is in connection with the external drive of the punch device via the tool drive. The drilling tool can also be operated on the indexing station. A ram, acting on the drilling tool via the ram engagement portion, of the punch device is driven for rotation in all conventional embodiments of the punch device. The ram, which is driven for rotation, allows machining tools to be selected from a multi-tool insert, in particular a multi-tool turret. Operating the drilling tool on the base station of the punch device is made possible by using the rotary drive of the ram. The ram is usually used for punching processes and/or to select the machining tool of the indexing station. In this process, the drilling tool is operated exclusively via the ram. The possibility of operating the drilling tool on the base station of the machine turret allows the flexibility and the efficiency of the punch device to be enhanced. Additional drive components, in particular configured as the tool drive, for driving the drilling tool are not required.

The drilling means accommodated in the tool shank can be configured as a drill to create cylindrical recesses, in particular a twist drill, or as a tap, in particular a short machine tap, or as a stage of a tap set, or as a reamer. The term tap shall be understood to include thread cutters and thread formers.

The ram engagement portion can be configured such as to ensure a detachable connection with the ram. The transmission of the rotational movement from the ram to the tool head via the ram engagement portion may take place via a positive or a non-positive connection.

The drilling tool may include a lubricating device. The lubricating device allows movable parts of the drilling tool and/or the drilling means to be supplied with lubricants and/or coolants. In particular, the lubricating device to guide the lubricant or coolant can be configured as a shank groove, which is oriented in particular axially, on the tool shank, in particular on an inner circumferential surface of the tool shank.

The housing may be rigidly connected to the machine turret. The tool shank may be provided with a shank sleeve, which may be mounted in the housing in a non-rotatable manner and/or may be mounted for displacement in the direction of the tool longitudinal axis. The tool head may be mounted for rotation about the tool longitudinal axis relative to the shank sleeve. The drilling means may be arranged in the shank sleeve. The drilling means may be mounted for rotation and/or for axial displacement relative to the shank sleeve. It is conceivable to arrange linear bearings, in particular ball bearings or sliding bearings, between the housing and the shank sleeve and/or between the shank sleeve and the drilling means. It is conceivable to arrange axial bearings or radial bearings, in particular configured as ball bearings or sliding bearings, between the tool head and the shank sleeve and/or between the shank sleeve and the drilling means.

The tool shank may have a single-part design. The tool shank can be connected to the tool head and the drilling means in such a way as to prevent rotational and axial movements. The tool head may be formed in one piece with the tool shank. This allows a particularly economical production of the drilling means.

As an alternative to operating the drilling tool on a turret punch device comprising a rotatable machine turret, the drilling tool may also be operated on a punch device, in particular a belt punch device or a coil punch device, comprising a linearly displaceable or stationary tool holder, or on any other punch device. In particular, the drilling tool may be arranged on a machine table or a single-user work station.

A drilling tool configured such that the tool head is connected, via the tool shank, to the drilling means in a torque-proof manner ensures an effective transmission of rotational movements from the ram to the drilling means. The tool head is connected to the drilling means via the shank sleeve of the tool shank in a torque-proof manner, thus allowing the rotational movement to be transmitted from the tool head to the drilling means. The connection between the tool head and the drilling means can be rigid, thus allowing the rotational movement of the ram to be transmitted from the tool head to the drilling means in a simple manner.

A drilling tool configured such that the ram engagement portion provided to transmit an axial lifting movement is formed by an external drive ensures an efficient and rugged transmission of lifting movements of the punch device to the drilling tool. The ram engagement portion may be provided with a ram thrust face. Via the ram thrust face, the ram interacts with the ram engagement portion in order to transmit the lifting movements of the ram to the tool head. The ram thrust face may be plane. The ram thrust face may also be conical or spherical, thus allowing an improved centering to be achieved. The material of the tool head may be hardened in the region of the ram engagement portion.

A drilling tool configured such that the ram engagement portion has a front-end and/or circumferential profiled section for transmitting the rotational movement ensures a rugged and effective transmission of the rotational movement from the ram to the tool head. The connection between the ram and the tool head allowing the transmission of the rotational movement may be a positive and/or a non-positive connection. The front-end profiled section of the ram engagement portion may be configured as a front-end toothed section. The circumferential profiled section of the ram engagement portion may be configured as a parallel key connection or as a splined shaft or as a polygon shaft or as a serration. The geometry of the ram engagement portion may be configured counter to the geometry of the ram in order to transmit the rotational movement in a positive manner.

A drilling tool configured such that the tool shank comprises a transmission element to convert the rotational movement of the tool head into a combined rotational and lifting movement of the drilling means ensures precise machining of a workpiece. As the rotational movement of the tool head is transmitted into a combined rotational and lifting movement of the drilling means, the rotational and lifting movements can be synchronized precisely, thus allowing a thread, for example, to be cut into the workpiece particularly precisely. The transmission element may be configured as a gear, in particular a spindle-type lifting gear, in particular with a leadscrew and a leadscrew nut, or as a ball screw drive or as a trapezoidal screw drive. A transmission of lifting movements from the punch device to the drilling tool to form the thread in the workpiece can be omitted. Preferably, the tool head is connected, via the transmission element, to the drilling means in a torque-proof manner.

The lubricating device can be configured as a fluid duct in the leadscrew nut. The fluid duct may include a component, which is oriented axially, in particular with an opening formed in the direction of the tool head, and/or a component, which is oriented obliquely, in particular with an opening directed towards the drilling means.

The transmission element may also be configured to decouple the speed of the drilling means from the speed of the tool head. The speed of the drilling means may therefore be lower or higher than the speed of the tool head. An advantageous result thereof is that a speed of the drilling means is decoupled from the available drive speed of the ram during machining.

A drilling tool configured such that the tool shank has an insert sleeve to accommodate the drilling means allows the drilling means to be secured to the drilling tool in a particularly simple manner. The insert sleeve may be mounted for rotation in the tool shank. The insert sleeve is connected to the tool head in a torque-proof manner. The drilling tool is secured in the insert sleeve in such a way that rotational and axial movements of the drilling means are prevented. In order to secure the drilling means in the insert sleeve, the insert sleeve may be provided with one or a plurality of magnets or with a spring-loaded thrust pad. In order to transmit the rotational movement, a positive connection may be provided between the drilling means and the insert sleeve.

In a method of operating a drilling tool for a punch device, in particular for a turret punch device, the method comprising the steps of providing a drilling tool according to the invention, moving the drilling tool into an initial position in which the drilling means does not engage a workpiece to be machined, rotating the tool head about the tool longitudinal axis via the ram engagement portion by means of the external drive, causing the drilling means to be rotated and displaced along the tool longitudinal axis in the direction of the workpiece in order to machine the workpiece, and rotating the tool head, via the ram engagement portion, about the tool longitudinal axis, causing the drilling means to be rotated and moved away from the workpiece along the tool longitudinal axis until the drilling means no longer engages the workpiece, the drilling means is moved through the workpiece by means of the punch device. The drilling means is driven for rotation via an external drive of the punch device, the external drive being connected to the drilling tool via the ram engagement portion of the tool head. The lifting movement can be transmitted to the drilling tool and the drilling means by the lifting movement of the ram transmitted via the ram engagement portion, for example. A control system of the punch device allows the lifting movement of the ram to be synchronized with the rotational movement. In order for a thread to be cut, it is conceivable to implement corresponding specifications for the lifting movement as a function of the rotational movement, in particular to form a predetermined pitch. The combined control operation of the lifting and rotational movements is advantageous for a drill hole to be reamed, and allows high-quality drill holes to be formed in the workpiece. Generally, the method allows the drilling tool to be used on a base station of the machine turret of the punch device.

A method of operating a drilling tool in such a way that prior to rotating the tool head, the drilling tool is moved out of its initial position by displacing the tool head, via the ram engagement portion, in the direction of the workpiece by means of an external drive in order to move the drilling means in the direction of the workpiece, and that after rotating, the drilling tool is moved back into its initial position by moving the tool head back and away from the workpiece allows the thread to be formed in the workpiece in an efficient and economical manner. The lifting movement transmitted to the tool head may be such that a gap between the tool shank and the workpiece is produced, which is smaller than 5 mm, in particular smaller than 3 mm, in particular smaller than 2 mm, in particular smaller than 1 mm. Displacing the drilling means in the direction of the workpiece by the lifting movement transmitted to the tool head ensures a particularly rapid advance of the drilling means in the direction of the workpiece.

A method of operating a drilling tool in such a way that the drilling means is moved through the workpiece exclusively by means of a rotational movement transmitted by an external drive ensures particularly precise machining of a workpiece. The rotational movement of the tool head can be converted, via the transmission element, into a combined lifting and rotational movement to be transmitted to the drilling means. The transmission element may be arranged between the tool head and the drilling means. As a result, a particularly precise synchronization of the lifting and rotational movements of the drilling means can be achieved, thus allowing a tap, for example, to be moved through the workpiece particularly precisely.

A method of operating a drilling tool in such a way that while the drilling means is being moved away from the workpiece, the drilling means is rotated in a rotational direction, which is reverse to that of the drilling means when being moved in the direction of the workpiece allows the thread to be formed in the workpiece in an effective manner. By rotating the drilling means, in particular the tap, in the reverse direction via the ram engagement portion of the tool head, the drilling means can be removed from the workpiece easily. For example, the tap can be moved upwardly out of the thread formed in the workpiece in a combined lifting and rotational movement by means of the external drive interacting with the ram engagement portion.

An exemplary embodiment of the invention will hereinafter be explained in more detail with the aid of the drawings.

DESCRIPTION OF THE PREFERRED EMBODIMENT

Figure 1:
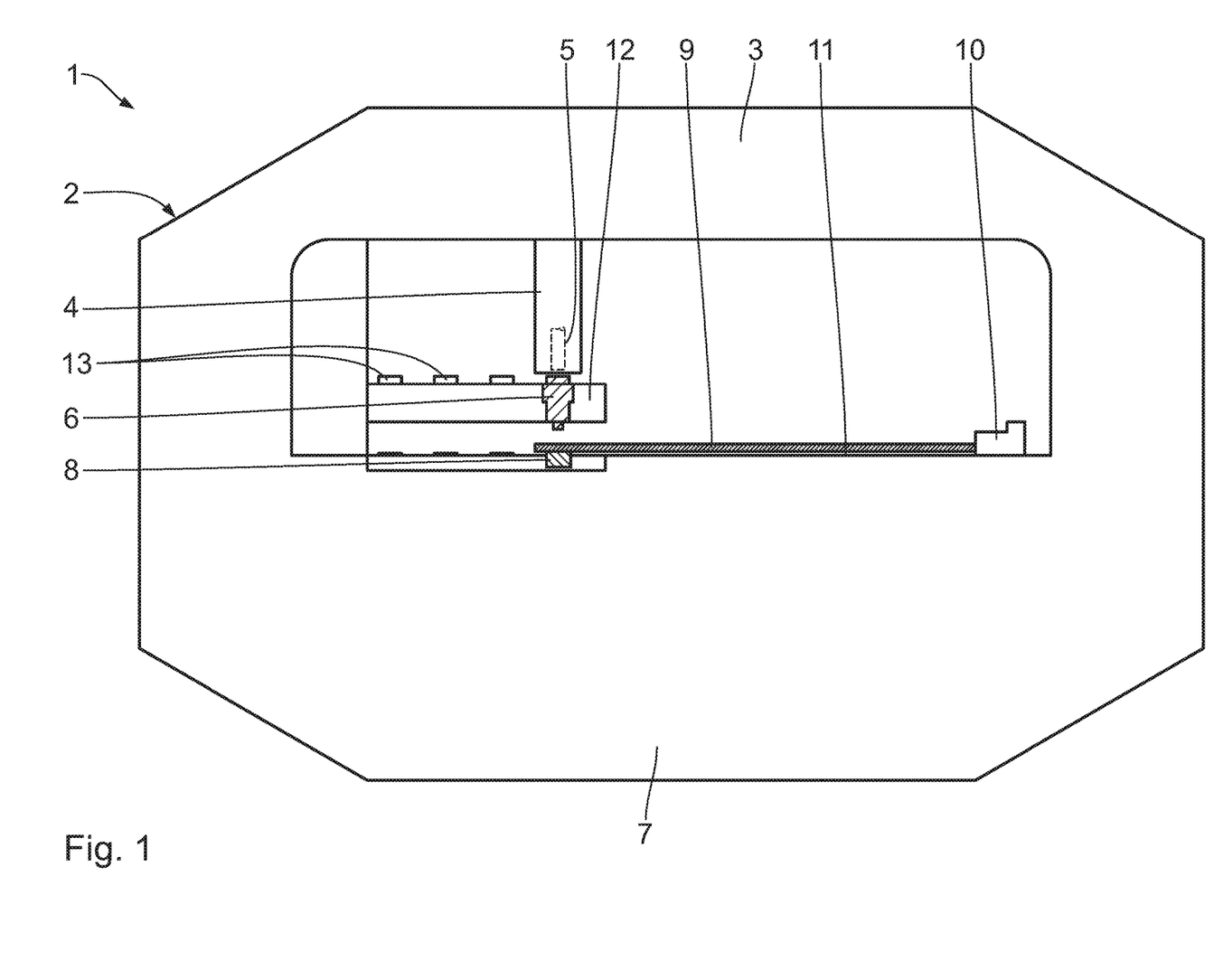
FIG. 1 shows a schematic side view of a punch device comprising a drilling tool according to the invention.

A punch device 1 as shown in FIG. 1 comprises a frame structure 2 the frame upper part 3 of which carries an actuating element 4 with a ram 5. Below the ram 5, a drilling tool 6 is arranged. A frame lower part 7 of the punch device 1 carries a workpiece counter-holder 8. Between the drilling tool 6 and the workpiece counter-holder 8, a workpiece 9 is disposed. By means of a positioning drive 10, the workpiece 9 can be positioned on a workpiece holder 11 of the punch device 1. The drilling tool 6 and the workpiece counter-holder 8 act as a punch and die. The drilling tool 6 and the workpiece counter-holder 8 are arranged on a machine turret 12. A change of machining tools can be performed by actuating the machine turret 12 via the punch device 1. The workpiece 9 may be a sheet plate, in particular a metal sheet plate.

Figure 2:
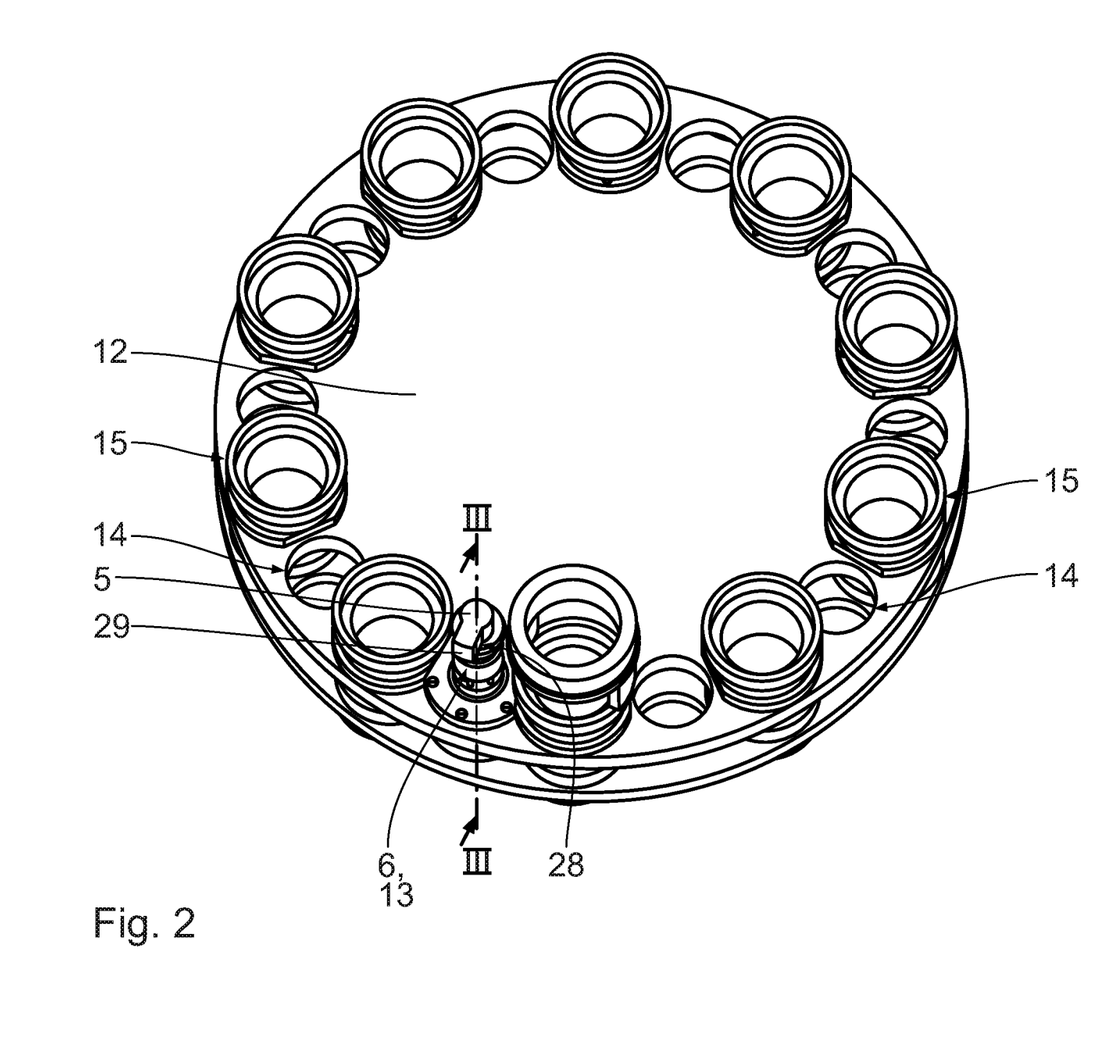
FIG. 2 shows a perspective view of a machine turret of the punch device with the inventive drilling tool on a base station of the machine turret.

The machine turret 12 with a drilling tool 6 secured thereto is shown in more detail in FIG. 2. The machine turret 12 comprises base stations 14 and indexing stations 15 to accommodate machining tools 13. The base stations 14 and the indexing stations 15 are arranged on the machine turret 12 in a circular pattern. The indexing stations 15 are drivable for rotation by means of a tool drive (not shown) of the punch device 1. The base stations 14 arranged between the indexing stations 15 are not driven by this tool drive. The indexing station 15 is suitable for accommodating a multi-tool insert. A multi-tool insert of this type may comprise a plurality of machining tools 13.

Figure 3:
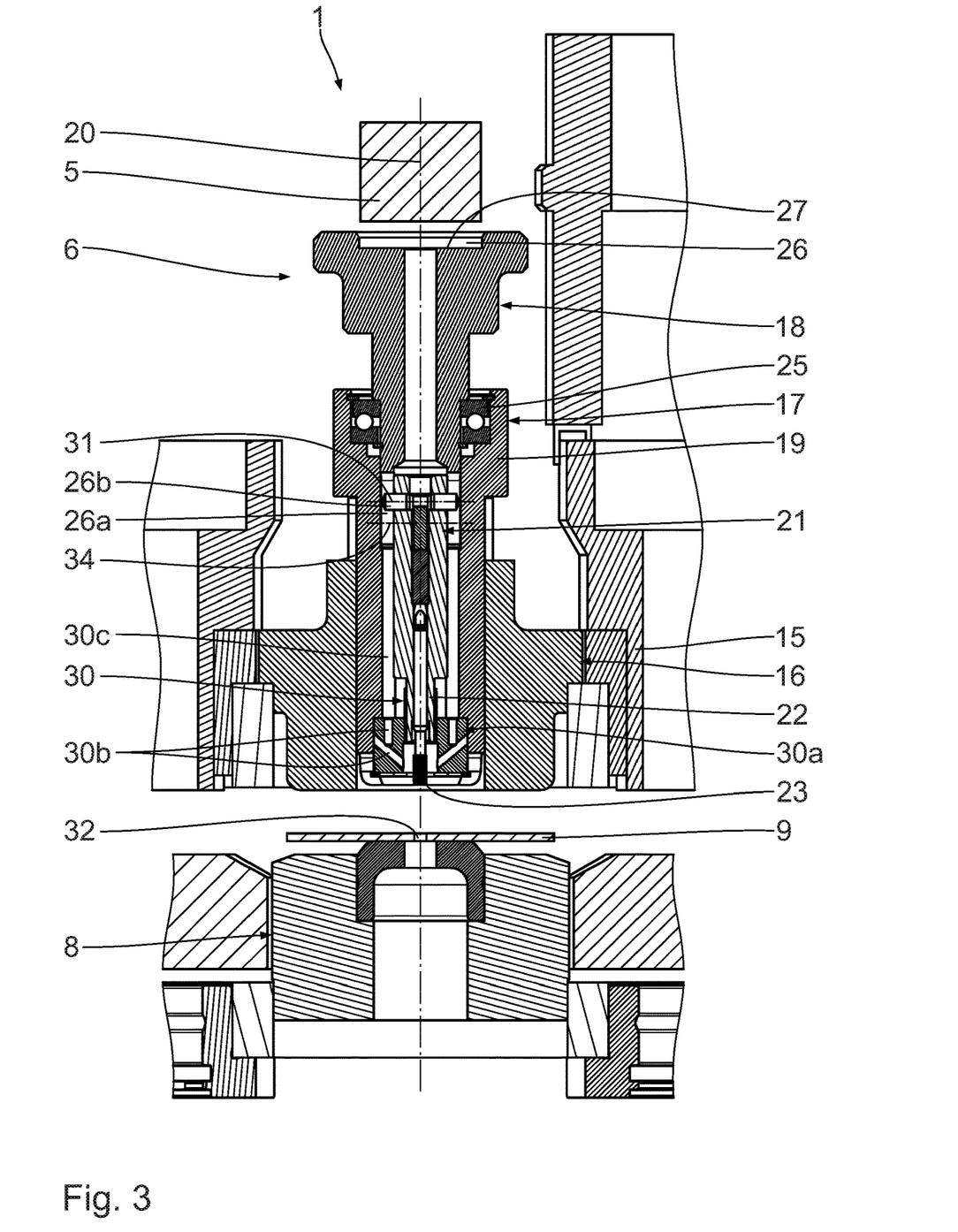
FIG. 3 shows a sectional view of the drilling tool along section line III-III in FIG. 2, the drilling tool being shown in an initial position with a ram being disengaged from a tool head.
Figure 4:
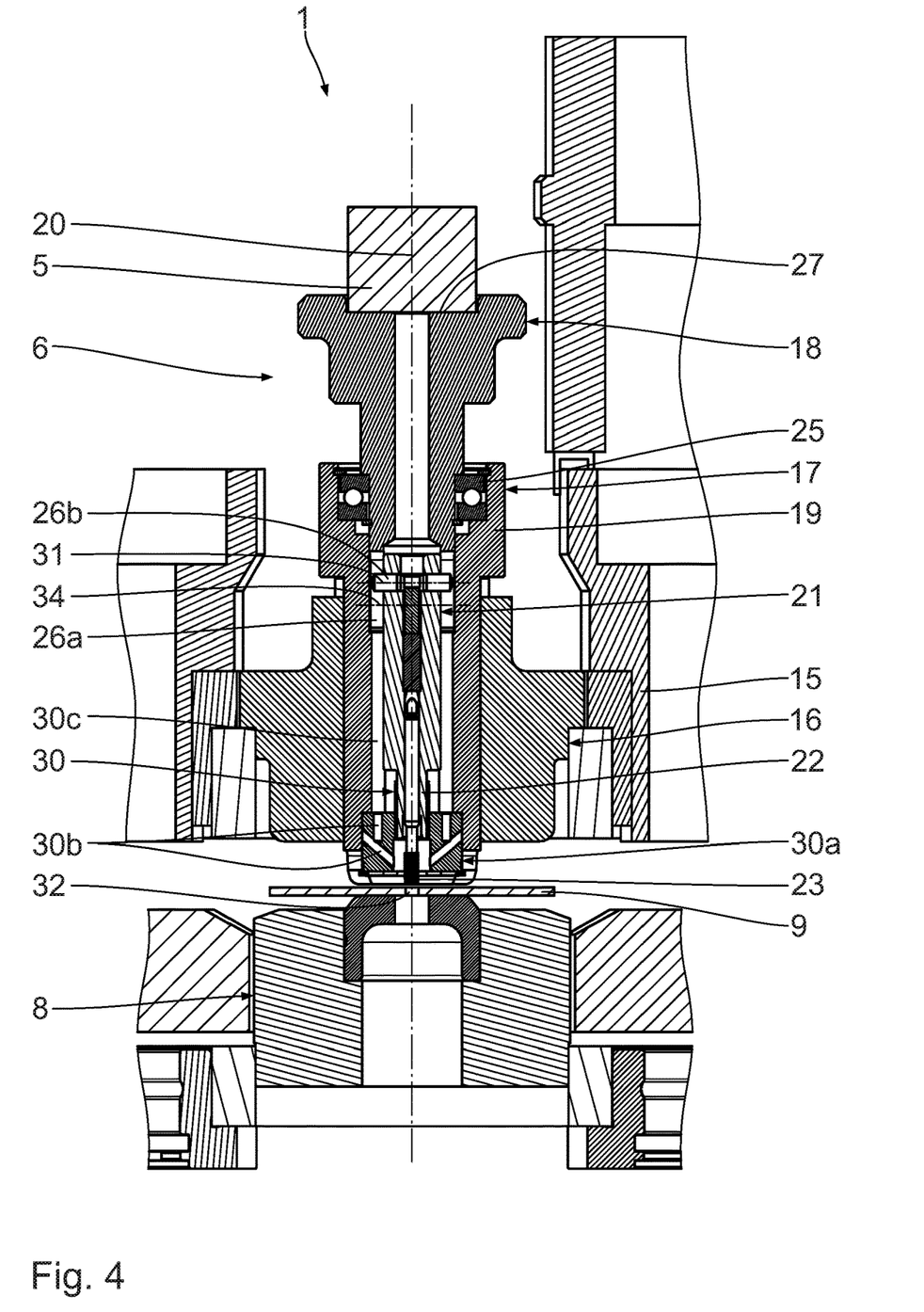
FIG. 4 shows a sectional view, similar to FIG. 3, of the drilling tool in an advance position in which the ram engages the tool head and a tool shank has been advanced in the direction of a workpiece.
Figure 5:
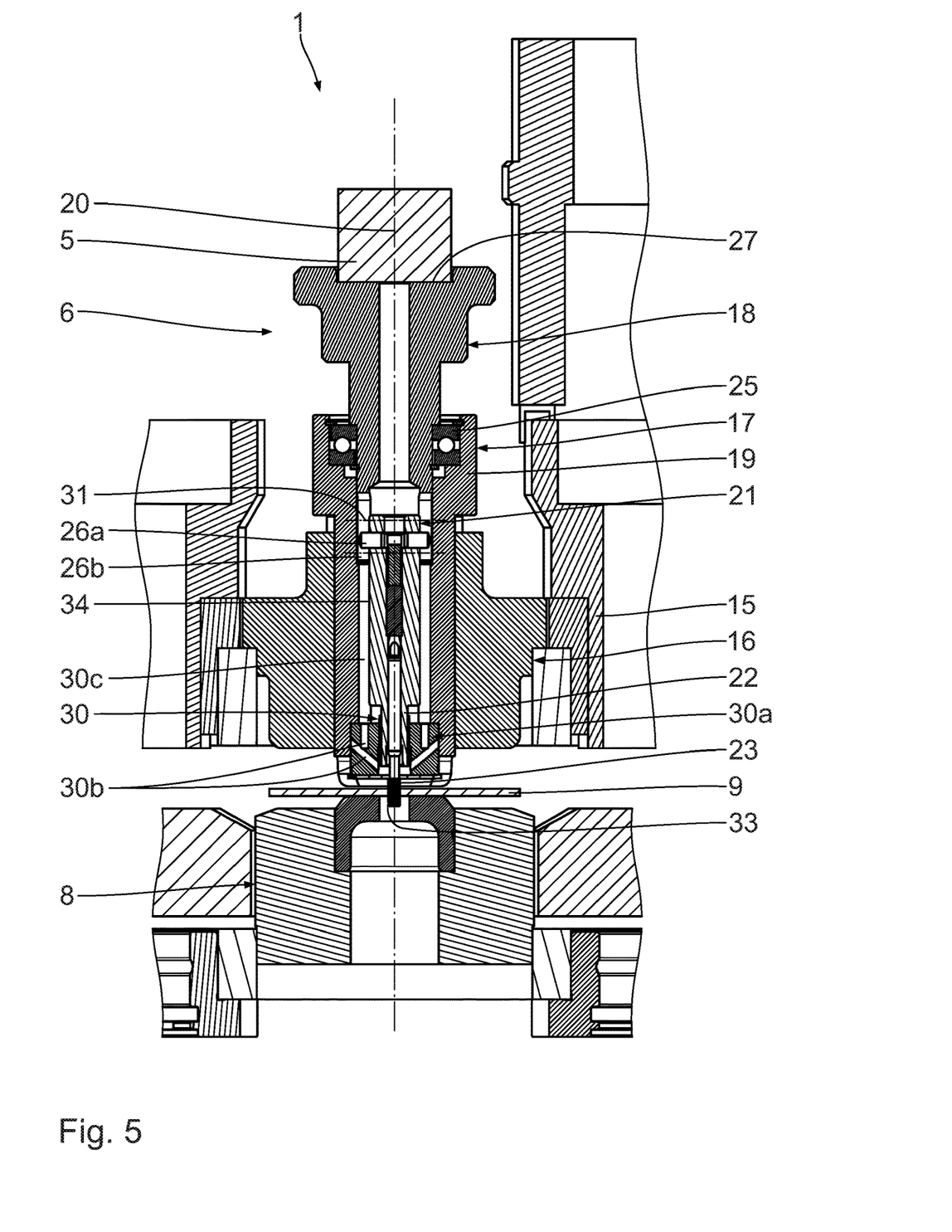
FIG. 5 shows a sectional view, similar to FIG. 3, of the drilling tool in a cutting position in which a drilling means secured to the tool shank penetrates the workpiece.

The drilling tool 6 is shown in more detail in FIGS. 3 to 5. The drilling tool 6 comprises a housing 16, a tool shank 17 and a tool head 18.

The tool shank 17 includes a shank sleeve 19. The shank sleeve 19 is mounted for displacement in the direction of a tool longitudinal axis 20. The shank sleeve 19 is connected to the housing 16 in a torque-proof manner. The shank sleeve 19 can be mounted in the housing 16 by means of a linear bearing, configured in particular as a sliding bearing or a ball bearing. The shank sleeve 19 is provided with a shank hole 20a. In the shank hole, a thrust piece 20b is inserted. In the initial position of the drilling tool 6, the thrust piece 20b engages a head hole 20c of the tool head 18. In the initial position of the drilling tool 6, a torque defined by the thrust piece 20b needs to be overcome in order to rotate the tool head 18 relative to the shank sleeve 19.

The tool shank 17 further comprises a transmission element 21 and an insert sleeve to accommodate a drilling means 23. The drilling means 23 is a tap. The transmission element 21 and the insert sleeve 22 are arranged inside the shank sleeve 19. The drilling means 23 is connected with the insert sleeve 22 and the transmission element 21 in a torque-proof manner. The drilling means 23 is firmly connectable to the insert sleeve 22 in the axial direction. The insert sleeve 22 is axially displaceable and mounted, via a radial bearing, for rotation in the shank sleeve 19.

The tool head 18 is firmly connected to the shank sleeve 19 in the axial direction. Between the tool head 18 and the shank sleeve 19, an axial bearing 25 configured as a ball bearing is arranged, which allows the tool head 18 to be rotated relative to the shank sleeve 19.

On its upper side, the tool head 18 is provided with a ram engagement portion 26 for the transmission of axial lifting and rotational movements by means of the ram 5. The ram engagement portion 26 includes a plane ram thrust face 27 to accommodate the ram 5 and to transmit axial forces. The ram engagement portion 26 further includes a front-end profiled section to ensure a non-rotational connection of the ram 5 with the tool head 18. The front-end profiled section is configured as a radial groove 28. The ram 5 includes a radial rib 29 configured to engage the radial groove 28 of the ram engagement portion 26. Alternatively, the ram engagement portion may also include a circumferential profiled section, in particular configured as a toothed section or a tongue/groove connection. The ram 5 is positively connected to the tool head 18 to ensure a common rotation about the tool longitudinal axis 20. The ram engagement portion 26 is configured such that the ram 25 is removable from the ram engagement portion 26 upwardly in the axial direction.

The tool head 18 includes a recess 26a configured as an elongate hole. Via a pin 26b, which engages the recess 26a, the transmission element 21 is connected to the tool head 18 in a torque-proof manner while permitting an axial displacement thereof. The transmission element 21 is arranged between the tool head 18 and the insert sleeve 22 and is connected with the latter in a torque-proof manner. The transmission element 21 is configured as a leadscrew, comprising in particular a trapezoidal screw drive or a ball screw drive. The transmission element 21 includes a screw element 30 with an external thread. The external thread of the screw element 30 engages an internal thread of one of the leadscrews nuts 30a, which is connected to the shank sleeve 19 in a torque-proof manner. The screw element 30 is connected to the insert sleeve 22 in a torque-proof manner. The leadscrew nut 30a includes a fluid duct 30b. The fluid duct 30b is configured to guide cooling lubricants. Via the fluid duct 30b, the cooling lubricant is guided, via the leadscrew nut 30a, from a shank groove 30c to the drilling means 23.

Figure 6:
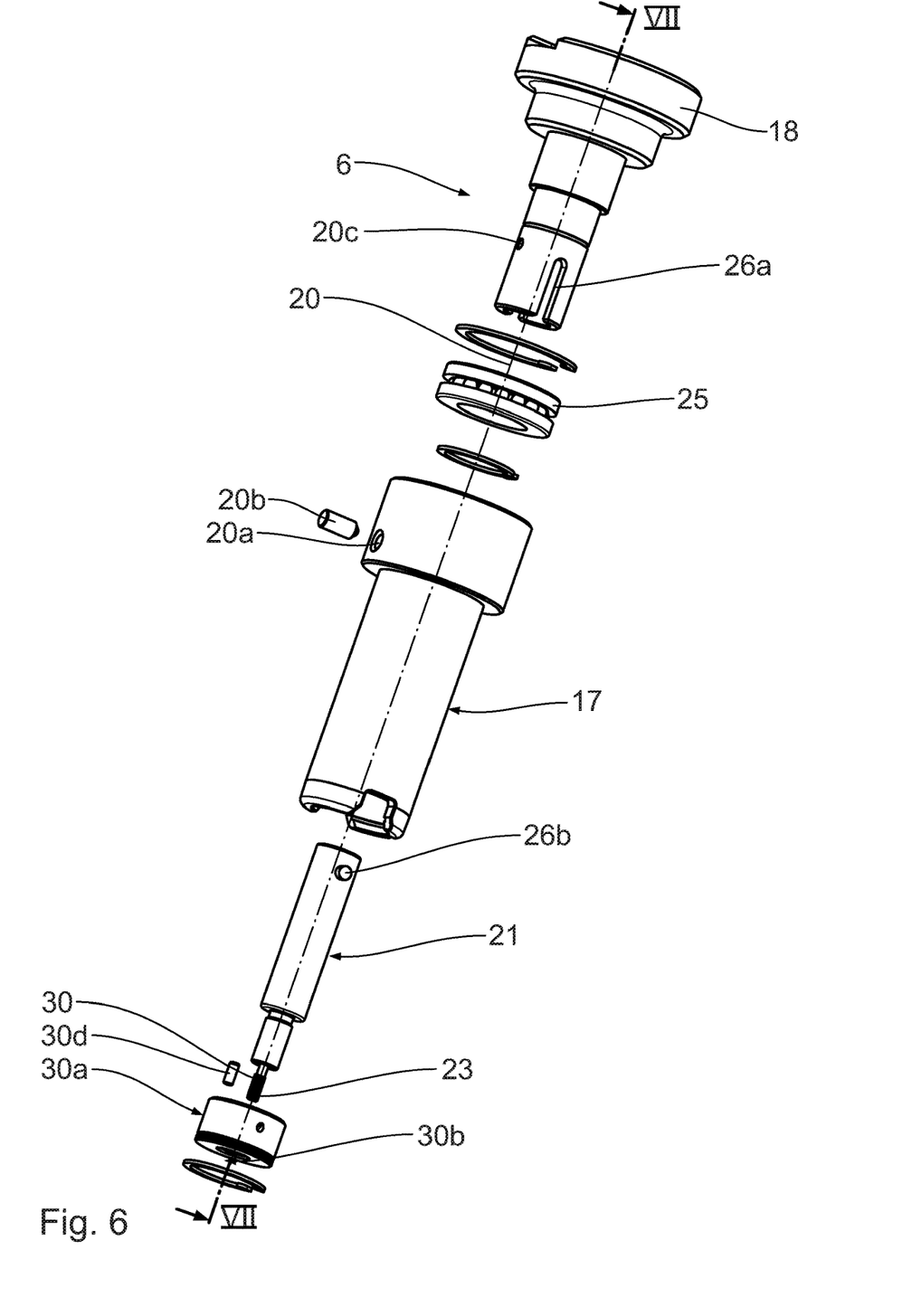
FIG. 6 shows an exploded view of the drilling tool according to FIG. 2 with the housing being omitted.
Figure 7:
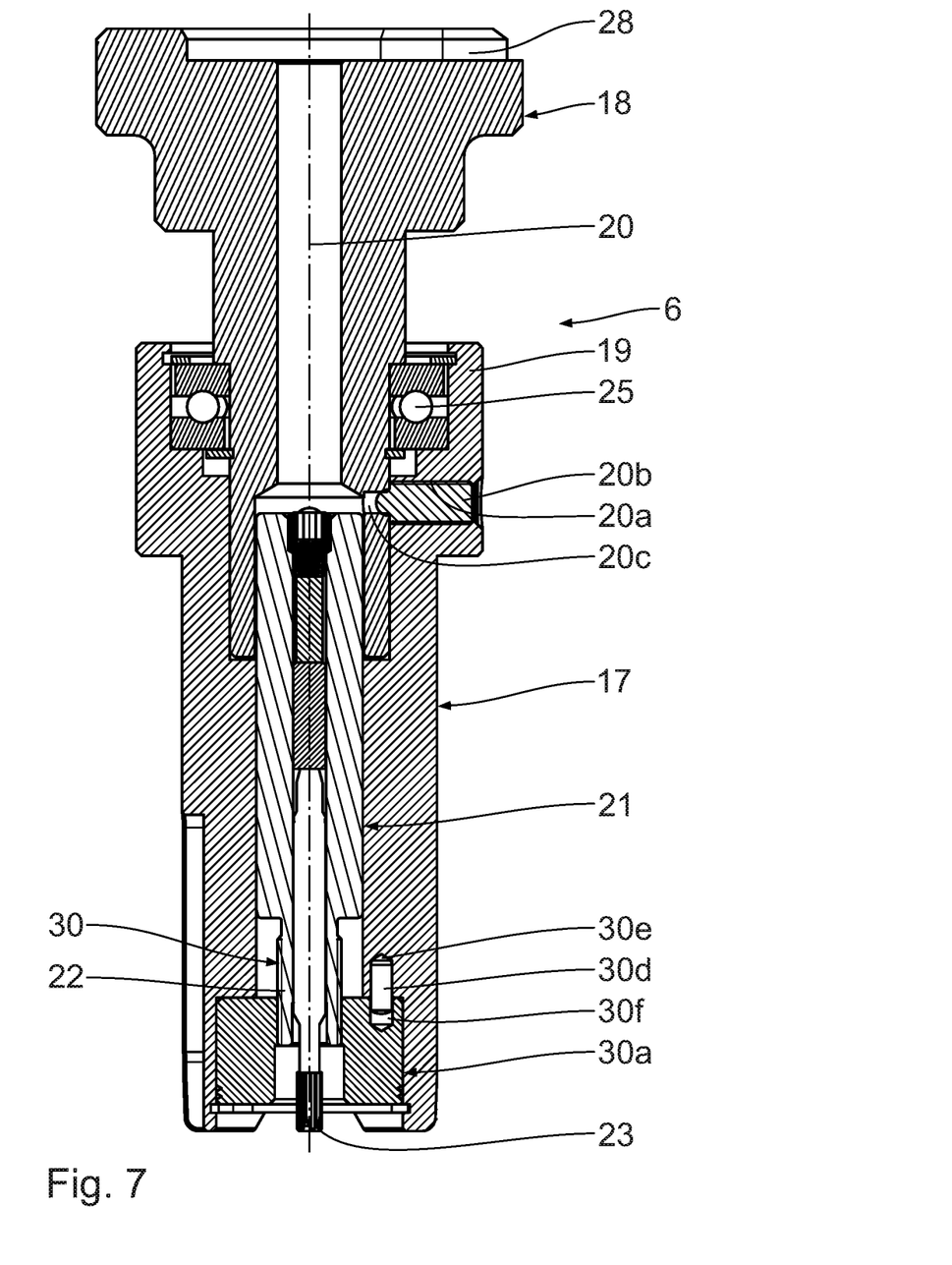
FIG. 7 shows a sectional view of the drilling tool along section line VII-VII in FIG. 6, the drilling tool being shown in the initial position.

The drilling tool 6 is shown in more detail in FIG. 6 and FIG. 7. Between the shank sleeve 19 and the leadscrew nut 30a, a leadscrew pin 30d is arranged. The leadscrew pin 30d permits the non-rotational connection between the leadscrew nut 30a and the shank sleeve 19. In order to accommodate the leadscrew pin 30d, the shank sleeve 19 has a shank pin hole 30e, and the leadscrew nut 30a has a nut pin hole 30f.

The functioning of the drilling tool 6 for a punch device 1 is as follows:

The drilling tool 6 is arranged below the ram 5 of the actuating element 4 by actuating the machine turret 12. By means of the positioning drive 10, the workpiece 9 is arranged between the drilling tool 6 and the workpiece counter-holder 8.

The drilling tool 6 is in its initial position, and the ram 5 does not engage the tool head 18. The screw element 30 is in a head position 31. The drilling means 23 is disposed inside the tool shank 17 and does not engage the workpiece 9. The workpiece 9 is positioned below the drilling tool 6 in such a way that a drill hole 32 is aligned coaxially with the tool longitudinal axis 20.

FIG. 4 shows the drilling tool 6 in an advance position. The ram 5 acting on the ram engagement portion 26 has been displaced downwardly in the axial direction, and the tool shank 17 has been moved in the direction of the workpiece 9. The shank sleeve 19 is advanced in the direction of the workpiece 9 so as to be positioned at approx. 1 mm from said workpiece 9. The drilling means 23 is disposed inside the tool shank 17 and does not protrude beyond said tool shank 17.

The tool head 18 is driven for rotation by the ram 5 via the ram engagement portion 26. The rotational movement is transmitted from the tool head 18 to the transmission element 21. The screw element 30 provided with the external thread rotates inside the internal thread of the leadscrew nut 30a, causing the former to be displaced axially downwardly. The rotation of the ram 5 causes the insert sleeve 22, which is connected to the transmission element 21, to be rotated and to be moved axially downwardly by means of the screw element 30 and the leadscrew nut 30a. The drilling means 23 arranged in the insert sleeve 22 is thus moved through the drill hole 32 of the workpiece 9. In this process, the drilling means 23 configured as a tap cuts a thread 33 into the workpiece 9.

FIG. 5 shows the drilling tool 6 in the cutting position. The tool shank 17 is still in its advance position of approx. 1 mm from the workpiece 9. The screw element 30 is in a cutting position 34, which is displaced axially downwardly relative to the head position 31. The drilling means 23 penetrates the workpiece 9 completely.

In order to displace the drilling tool 6 into the initial position, the ram 5 is first rotated in the opposite direction. This causes the screw element 30 to be moved back into its head position 31, thus causing the drilling means 23 to be removed from the workpiece 9. The advance position of the drilling tool 6 is reached as soon as the drilling means 23 has disengaged from the workpiece 9 and is disposed entirely inside the tool shank 17. By means of the punch device 1, the ram is moved upwards in the axial direction, causing the tool shank 17 to be moved upwards in the axial direction as well. The additional movement of the ram 5 in the axial direction causes the ram 5 to be decoupled from the ram engagement portion 26. The drilling tool 6 is in the initial position.

For further processing the workpiece 9, the workpiece 9 can be repositioned relative to the drilling tool 6 by means of the positioning drive 10 to form another thread 33. Alternatively, the machining tool 13 can be changed by actuating the machine turret 12. The machining tool 13 to be put in can be arranged on a base station 14 or on an indexing station 15. The machining tool 13 to be put in can be another drilling tool 6 or another machining tool 13.

Alternatively, the drilling means 23 can be configured as a reamer. Reaming a drill hole 32 formed in the workpiece 9 can be performed in two steps. In a first step, the drilling means 23 is moved through the workpiece by a combined lifting and rotational movement transmitted to the ram engagement portion 26 by means of the ram 5, causing the drilling tool 6 to be displaced from the initial position directly into the cutting position. In a second step, the drilling means 23 is moved out of the workpiece 9 and back into the initial position by a combined lifting and rotational movement transmitted via the ram engagement portion 26. The rotational direction of the rotational movement of the drilling means 23 corresponds to the rotational direction of the drilling means 23 in the first step. It is therefore not necessary to reverse the rotational direction.

What is claimed is:

1. A drilling tool for a punch device, comprising
a housing;
a tool shank arranged in the housing with a drilling means accommodated therein; and
a tool head arranged on the tool shank to interact with the punch device,
wherein the tool head has a ram engagement portion to transmit a rotational movement about a tool longitudinal axis from an external drive via a ram of the punch device to the tool head,
wherein the ram engagement portion is configured such that the ram of the punch device is disengageable from the ram engagement portion along the tool longitudinal axis,
wherein the tool head is configured in such a way that the tool head is driven exclusively via the ram engagement portion, and
wherein the tool shank comprises a transmission element to convert the rotational movement of the tool head into a combined rotational and lifting movement of the drilling means.

2. The drilling tool according to claim 1, wherein the punch device is a turret punch device.

3. The drilling tool according to claim 1, wherein the tool head is connected, via the tool shank, to the drilling means in a torque-proof manner.

4. The drilling tool according to claim 1, wherein the ram engagement portion configured to transmit an axial lifting movement is formed by an external drive.

5. The drilling tool according to claim 1, wherein the ram engagement portion has at least one of the group comprising a front-end profiled section and a circumferential profiled section for transmitting the rotational movement.

6. The drilling tool according to claim 1, wherein the tool shank has an insert sleeve to accommodate the drilling means.

7. A method of operating a drilling tool for a punch device, the method comprising the following steps:
providing the drilling tool according to claim 1,
moving the drilling tool into an initial position in which the drilling means does not engage a workpiece to be machined,
rotating the tool head about the tool longitudinal axis via the ram engagement portion by means of the external drive, causing the drilling means to be rotated and displaced along the tool longitudinal axis in the direction of the workpiece in order to machine the workpiece,
rotating the tool head via the ram engagement portion about the tool longitudinal axis, causing the drilling means to be rotated and moved away from the workpiece along the tool longitudinal axis until the drilling means no longer engages the workpiece.

8. The method according to claim 7, wherein prior to rotating the tool head, the drilling tool is moved out of its initial position by displacing the tool head, via the ram engagement portion, in the direction of the workpiece by means of an external drive in order to move the drilling means in the direction of the workpiece, and that after rotating, the drilling tool is moved back into its initial position by moving the tool head back and away from the workpiece.

9. The method according to claim 7, wherein the drilling means is moved through the workpiece exclusively by means of a rotational movement transmitted by an external drive.

10. The method according to claim 7, wherein while the drilling means is being moved away from the workpiece, the drilling means is rotated in a rotational direction, which is reverse to that of the drilling means when being moved in the direction of the workpiece.

11. The drilling tool according to claim 1, wherein the transmission element is a spindle-type lifting gear.

12. The drilling tool according to claim 1, wherein the transmission element comprises a leadscrew and a leadscrew nut.

13. The drilling tool according to claim 1, wherein the transmission element is a ball screw drive.

14. The drilling tool according to claim 1, wherein the transmission element is a trapezoidal screw drive.

* * * * *